(12) United States Patent
Karicherla et al.

(10) Patent No.: US 7,418,868 B1
(45) Date of Patent: Sep. 2, 2008

(54) PRESSURE SENSOR AND METHOD OF FABRICATING SUCH A MODULE

(75) Inventors: Annapurna Karicherla, Valencia, CA (US); Sheldon Williams, Green Valley, CA (US); Gene A. Bornzin, Simi Valley, CA (US); John W. Poore, South Pasadena, CA (US); Dion F. Davis, Acton, CA (US)

(73) Assignee: Pacesetter, Inc., Sylmar, CA (US)

( * ) Notice: Subject to any disclaimer, the term of this patent is extended or adjusted under 35 U.S.C. 154(b) by 108 days.

(21) Appl. No.: 11/359,952

(22) Filed: Feb. 21, 2006

(51) Int. Cl.
*G01L 7/00* (2006.01)

(52) U.S. Cl. .......................................... 73/700; 600/488
(58) Field of Classification Search .................. 73/700; 600/488, 486
See application file for complete search history.

(56) References Cited

U.S. PATENT DOCUMENTS

| | | | |
|---|---|---|---|
| 4,331,156 A | 5/1982 | Apple et al. | |
| 4,407,296 A * | 10/1983 | Anderson | 600/488 |
| 4,485,813 A | 12/1984 | Anderson et al. | |
| 4,712,555 A | 12/1987 | Thornander et al. | 128/419 PG |
| 4,788,980 A | 12/1988 | Mann et al. | 128/419 PG |
| 4,913,164 A | 4/1990 | Greene et al. | |
| 4,940,052 A | 7/1990 | Mann et al. | 128/419 PG |
| 5,025,786 A | 6/1991 | Siegel | |
| 5,222,506 A * | 6/1993 | Patrick et al. | 607/126 |
| 5,300,107 A | 4/1994 | Stokes et al. | |
| 5,353,800 A | 10/1994 | Pohndorf et al. | 128/673 |
| 5,466,254 A | 11/1995 | Helland | 607/123 |
| 5,476,483 A | 12/1995 | Bornzin et al. | 607/17 |
| 5,535,752 A | 7/1996 | Halperin et al. | 128/670 |

(Continued)

FOREIGN PATENT DOCUMENTS

EP 0 757 542 B1 6/2000

(Continued)

OTHER PUBLICATIONS

NonFinal Office Action, mailed Sep. 13, 2006: U.S. Appl. No. 11/053,374.

(Continued)

*Primary Examiner*—Andre J Allen

(57) ABSTRACT

A body fluid pressure sensor module according to the invention comprises a housing having a first end and a second end and enclosing a pressure sensor. The pressure sensor is electrically coupled to a plurality of electrical conductors extending into the housing through a feedthrough disposed within, and hermetically sealing, the first end of the housing. The housing defines a chamber disposed between the feedthrough and the second end of the housing. The chamber contains a material in communication with the pressure sensor, the material being capable of transmitting pressure variations to the pressure sensor. The plurality of electrical conductors have ends within the housing, and the pressure sensor is mounted on the end of at least one of the conductors. Also disclosed are medical leads incorporating the pressure sensor module, and methods for fabricating the modules. The pressure sensor module is compact, and particularly so where cable conductors are utilized and the sensor is directly mounted on at least one of the cable conductors. The compactness of a pressure sensor module pursuant to the invention facilitates its incorporation into a small diameter, flexible medical lead enhancing its placement within a patient's body, for example, within the left atrium of the heart.

13 Claims, 14 Drawing Sheets

U.S. PATENT DOCUMENTS

| | | | |
|---|---|---|---|
| 5,564,434 A * | 10/1996 | Halperin et al. | 600/488 |
| 5,796,044 A | 8/1998 | Cobian et al. | |
| 5,810,014 A | 9/1998 | Davis et al. | |
| 5,855,592 A | 1/1999 | McGee et al. | |
| 5,871,531 A | 2/1999 | Struble | |
| 5,921,935 A | 7/1999 | Hickey | |
| 6,221,024 B1 * | 4/2001 | Miesel | 600/486 |
| 6,309,350 B1 | 10/2001 | VanTassel et al. | 600/300 |
| 6,314,323 B1 | 11/2001 | Ekwall | 607/23 |
| 6,328,699 B1 * | 12/2001 | Eigler et al. | 600/486 |
| 6,589,184 B2 | 7/2003 | Norén et al. | 600/486 |
| 6,666,826 B2 | 12/2003 | Salo et al. | 600/485 |
| 6,746,404 B2 | 6/2004 | Schwartz | |
| 6,876,885 B2 | 4/2005 | Swoyer et al. | |
| 7,149,587 B2 | 12/2006 | Wardle et al. | |
| 7,162,926 B1 * | 1/2007 | Guziak et al. | 73/729.2 |
| 2002/0055764 A1 | 5/2002 | Malonek et al. | |
| 2002/0111662 A1 | 8/2002 | Iaizzo et al. | |
| 2002/0120200 A1 | 8/2002 | Brockway et al. | |
| 2002/0138009 A1 | 9/2002 | Brockway et al. | |
| 2002/0161423 A1 | 10/2002 | Lokhoff et al. | |
| 2003/0045800 A1 | 3/2003 | Noren et al. | 600/484 |
| 2003/0045805 A1 | 3/2003 | Sheldon et al. | 600/513 |
| 2003/0055344 A1 | 3/2003 | Eigler et al. | |
| 2003/0078506 A1 | 4/2003 | Noren et al. | 600/485 |
| 2003/0130581 A1 | 7/2003 | Salo et al. | 600/485 |
| 2003/0195600 A1 | 10/2003 | Tronnes et al. | |
| 2003/0195602 A1 | 10/2003 | Boling | |
| 2003/0199779 A1 | 10/2003 | Muhlenberg et al. | 600/513 |
| 2003/0199934 A1 | 10/2003 | Struble et al. | 607/17 |
| 2003/0199962 A1 | 10/2003 | Struble et al. | |
| 2004/0116992 A1 | 6/2004 | Wardle et al. | |
| 2004/0147969 A1 | 7/2004 | Mann et al. | |
| 2004/0187875 A1 | 9/2004 | He et al. | |
| 2004/0215307 A1 | 10/2004 | Michels et al. | |
| 2004/0230283 A1 | 11/2004 | Prinzen et al. | |
| 2005/0065589 A1 | 3/2005 | Schneider et al. | |
| 2005/0165456 A1 | 7/2005 | Mann et al. | |
| 2006/0041300 A1 | 2/2006 | Zhang et al. | |
| 2006/0064135 A1 | 3/2006 | Brockway | |
| 2006/0116590 A1 | 6/2006 | Fayram et al. | |
| 2007/0028698 A1 * | 2/2007 | Guziak et al. | 73/729.2 |

FOREIGN PATENT DOCUMENTS

| | | |
|---|---|---|
| EP | 0 757 541 B1 | 11/2002 |
| EP | 1 024 856 B1 | 10/2004 |
| WO | WO 94/13200 | 6/1994 |
| WO | WO 96/26670 | 9/1996 |
| WO | WO 96/26674 | 9/1996 |
| WO | 03037428 A2 | 5/2003 |
| WO | WO 03/03748 A2 | 5/2003 |
| WO | WO 03/03748 A3 | 5/2003 |
| WO | WO 03/057315 A1 | 7/2003 |
| WO | WO 03/089056 A1 | 10/2003 |

OTHER PUBLICATIONS

Final Office Action, mailed Aug. 22, 2007: U.S. Appl. No. 11/053,374.

NonFinal Office Action, mailed Oct. 31, 2007: U.S. Appl. No. 11/053,374.

Notice of Allowance, mailed May 1, 2008: U.S. Appl. No. 11/053,374.

NonFinal Office Action, mailed Oct. 31, 2006: U.S. Appl. No. 11/053,518.

Final Office Action, mailed Apr. 20, 2007: U.S. Appl. No. 11/053,518.

NonFinal Office Action, mailed May 31, 2007: U.S. Appl. No. 11/053,518.

Final Office Action, mailed Dec. 21, 2007: U.S. Appl. No. 11/053,518.

Advisory Action, mailed Apr. 7, 2008: U.S. Appl. No. 11/053,518.

NonFinal Office Action, mailed May 23, 2007: U.S. Appl. No. 11/053,493.

Final Office Action, mailed Sep. 24, 2007: U.S. Appl. No. 11/053,493.

Notice of Allowance, mailed Oct. 22, 2007: U.S. Appl. No. 11/053,493.

NonFinal Office Action, mailed Nov. 1, 2006: U.S. Appl. No. 11/053,494.

Final Office Action, mailed Apr. 20, 2007: U.S. Appl. No. 11/053,494.

Advisory Action, mailed May 30, 2007: U.S. Appl. No. 11/053,494.

NonFinal Office Action, mailed Jul. 25, 2007: U.S. Appl. No. 11/053,494.

NonFinal Office Action, mailed Oct. 18, 2007: U.S. Appl. No. 11/053,494.

Final Office Action, mailed Apr. 14, 2008: U.S. Appl. No. 11/053,494.

NonFinal Office Action, mailed Feb. 5, 2007: U.S. Appl. No. 11/053,566.

NonFinal Office Action, mailed Oct. 1, 2007: U.S. Appl. No. 11/053,566.

NonFinal Office Action, mailed Dec. 26, 2007: U.S. Appl. No. 11/053,566.

NonFinal Office Action, mailed Dec. 28, 2006: U.S. Appl. No. 11/053,373.

Final Office Action, mailed Apr. 5, 2007: U.S. Appl. No. 11/053,373.

Notice of Allowance, mailed May 31, 2007: U.S. Appl. No. 11/053,373.

NonFinal Office Action, mailed Mar. 14, 2008: U.S. Appl. No. 11/053,468.

* cited by examiner

PRESSURE SENSOR AND METHOD OF FABRICATING SUCH A MODULE

CROSS REFERENCE TO RELATED APPLICATIONS

This application is related to the following copending U.S. patent applications all of which were filed Feb. 7, 2005:

1) Ser. No. 11/053,374, titled "Trans-Septal Intra-Cardiac Lead System";

2) Ser. No. 11/053,518, titled "Trans-Septal Intra-Cardiac Lead System";

3) Ser. No. 11/053,493, tilted "Trans-Septal Intra-Cardiac Lead System";

4) Ser. No. 11/053,494, tilted "Trans-Septal Intra-Cardiac Lead System";

5) Ser. No. 11/053,566, tilted "Trans-Septal Intra-Cardiac Lead System";

6) Ser. No. 11/053,373, tilted "Trans-Septal Intra-Cardiac Lead System"; and

7) Ser. No. 11/053,468, tilted "Trans-Septal Intra-Cardiac Lead System".

FIELD OF THE INVENTION

The present invention relates generally to electrical medical devices and particularly to a pressure sensor module carrying a sensor adapted to measure pressure such as, for example, the blood pressure within a chamber of the heart. The invention further relates to a lead incorporating such a pressure sensor module and to a method of making such a sensor module.

BACKGROUND OF THE INVENTION

Sensors for measuring pressure within a body cavity, organ or vessel have been in use for many years. For example, when a patient's heart does not function normally due to a genetic or acquired condition, various treatments may be prescribed to correct or compensate for the condition. Pharmaceutical therapy may be prescribed for the patient or a pacemaker may be implanted in the patient to improve the operation of the patient's heart.

In conjunction with such therapy it may be desirable to measure pressure in one or more chambers of the heart. For example, absolute cardiac pressure may be used as an indicator for several potentially lethal cardiac conditions. By measuring cardiac pressure, abnormal conditions may be detected and in some cases the patient's therapy may be modified to compensate for the abnormal conditions. As an example, if cardiac pressure is continuously measured, the operation of an implanted device such as a pacemaker may be adjusted, as necessary, according to conditions diagnosed as a result of the pressure measurements.

Conventionally, pressure sensing devices have been used to measure pressures on the right side of the heart. However, measurements of right side pressure may not provide sufficient indications for detection of conditions such as congestive heart failure, hypertension and mitral valve defects. In particular, left atrial pressure has been identified as an excellent indicator for left ventricular failure.

Obtaining pressure measurements from the left side of the heart presents several challenges. First, access to the left side of the heart must be provided in a safe manner. In addition, the pressure sensors need to be implanted in a manner ensuring that accurate pressure measurements may be made.

Cardiac blood pressure may be measured directly in real time using a pressure sensor device incorporated into a distal end of a permanent or temporary endocardial lead. The lead is typically inserted into the right side of the heart and routed through an opening formed in a septal wall to gain access to the left side of the heart. The lead includes one or more sensors for measuring cardiac pressure on the left side of the heart and, if needed, the right side of the heart. The lead also includes an attachment structure that secures the distal end of the lead to the septal wall.

It will be evident that the diameter of the lead should be as small as possible to minimize trauma to the septum during placement of the lead and to permit the lead to be utilized with other endocardial leads suitable for delivering multi-chamber stimulation, sensing and shock therapy.

As exemplified by U.S. Pat. No. 5,564,434 issued on Oct. 15, 1996, existing pressure sensor devices that are incorporated into endocardial leads use some form of substrate carrying a pressure sensor chip and associated circuitry enclosed within a housing having feedthroughs for making electrical connections. Such pressure sensor devices tend to be bulky and the endocardial leads into which they are incorporated need to have relatively large diameters, for example, greater than 0.104 inch (8 F), compromising their flexibility, making their placement more difficult and time consuming, and limiting the number of leads that may be placed. These sensor devices further tend to be complex, including housing parts that are difficult and expensive to machine. These disadvantages are not offset by any appreciable gain in functionality.

Another drawback of existing endocardial lead pressure sensor devices results from the sealing of the ends of the housing. In an effort to provide a hermetically sealed housing, metal closures are welded to the housing ends. However, the thermal expansion of the dielectric gel or oil used to fill the housing cannot be compensated for by the metal closures, sometimes causing leaks and adversely affecting the sensor's thermal response.

SUMMARY

In accordance with one illustrative embodiment, there is provided a pressure sensor module comprising a housing containing a pressure sensor. The pressure sensor is electrically connected to a plurality of electrical conductors extending into the housing through a feedthrough disposed within, and hermetically sealing, a first end of the housing. The housing defines a chamber between the electrical conductor feedthrough and a second end of the housing. The chamber contains a material in communication with the pressure sensor, the material being capable of transmitting pressure to the pressure sensor. In one embodiment, the plurality of electrical conductors have ends within the housing and the pressure sensor is mounted on the end of at least one of the conductors.

One advantage of the sensor module is the substantial size reduction achieved, particularly where cable conductors are utilized and the pressure sensor is carried by one or more of the conductors, instead of on a substrate. The compactness of a pressure sensor module pursuant to the present invention facilitates its incorporation into a small diameter, flexible lead enhancing the lead's placement for providing physiologically-based pressure signals representative of, for example, fluid pressure at or within a selected body site such as a chamber of the heart or the pericardial sac thereof.

In one embodiment, there is provided an endocardial lead comprising an elongated, longitudinally-extending, electrically insulating lead body sheath having a proximal end and a distal end portion. An electrical connector assembly is attached to the proximal end of the lead body sheath. The lead further comprises a pressure sensor module disposed within the distal end portion of the lead body sheath, the module comprising a longitudinally-extending, electrically conductive housing electrically coupled to a terminal contact on the connector assembly. The housing has a distal part projecting from a distal extremity of the lead body sheath, the distal part of the housing being adapted to function as a cardiac tissue electrical stimulation and/or sensing electrode. The module further includes a pressure sensor disposed within the housing, the sensor being electrically coupled to associated terminal contacts on the electrical connector assembly.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive.

BRIEF DESCRIPTION OF THE DRAWINGS

The foregoing and other objects, features and advantages of the invention will become evident to those skilled in the art from the detailed description of the preferred embodiments, below, taken together with the accompanying drawings, in which.

DETAILED DESCRIPTION

The following description presents preferred embodiments of the invention representing a best mode contemplated for practicing the invention. This description is not to be taken in a limiting sense but is made merely for the purpose of describing the general principles of the invention whose scope is defined by the appended claims. Although it will be evident that the invention has broad utility in that it may be used to provide electrical signals representative of fluid pressures at a wide variety of selected body sites, and may be incorporated in various lead types, including but not limited to, endocardial and epicardial leads, the invention will be described herein principally for measuring blood pressure in the left atrium of the heart.

Figure 1:
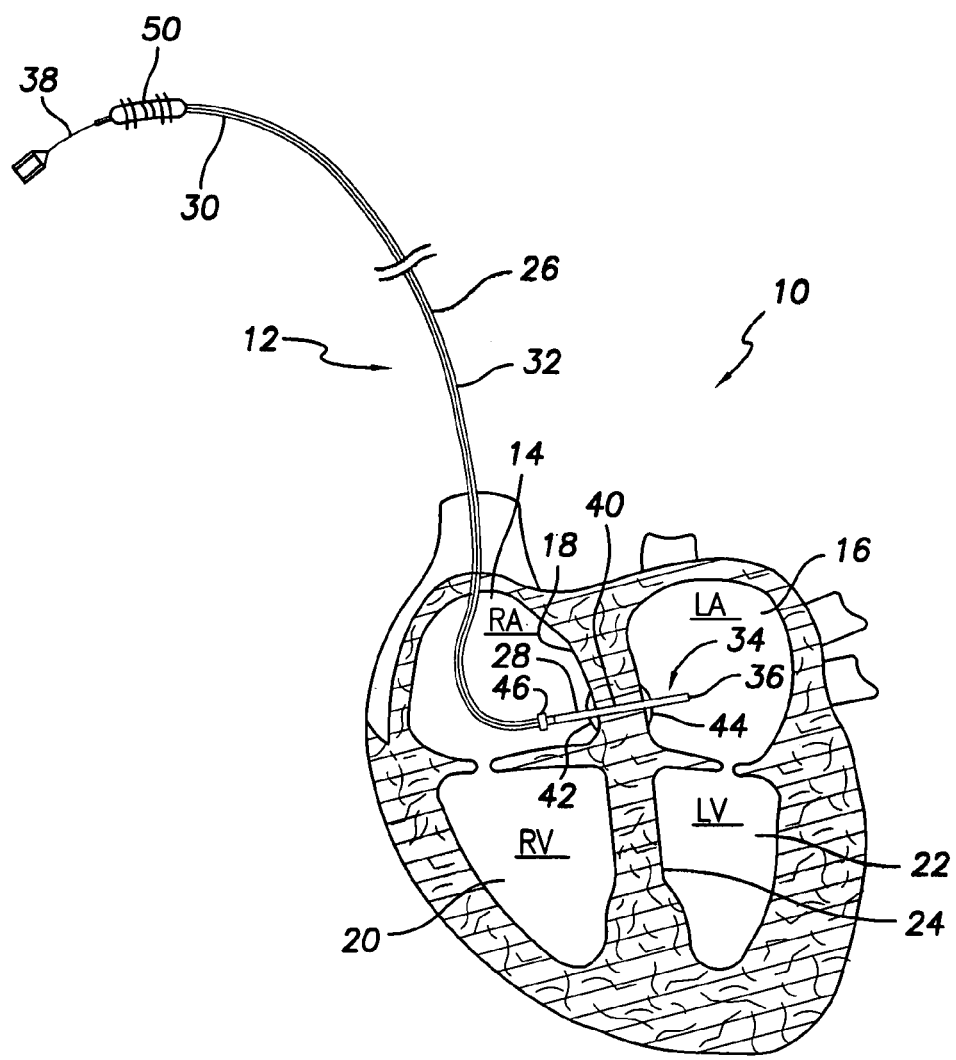
FIG. 1 is a schematic illustration of a human heart having placed therein an endocardial lead incorporating in a distal end portion thereof a cardiac pressure sensor module in accordance with one embodiment of the invention.

FIG. 1 schematically depicts a human heart 10 having placed therein a lead 12 in accordance with embodiments of the present invention. The heart comprises right and left atrial chambers 14 and 16, respectively, separated by an atrial septum 18, and right and left ventricular chambers 20 and 22, respectively, separated by a ventricular septum 24. The lead 12, shown implanted, by way of example, through the atrial septum 18, includes a lead body 26 having a distal end portion 28 and a proximal end 30. The lead body 26 further comprises a sheath 32 made of a biostable, biocompatible insulating material such as silicone rubber or polyurethane. The sheath 32 may comprise a conventional multilumen structure enclosing one or more electrical conductors, and may include fluid carrying lumens and/or other components (not shown). In the specific, exemplary embodiment of FIG. 1, the distal end portion 28 of the lead body encloses a pressure sensor module 34 adjacent a distal tip 36 of the lead body. The pressure sensor module 34 may be entirely or partially positioned in the left atrium 16 when the lead is placed or implanted so as to monitor the pressure therein.

The distal end portion 28 of the lead body may be initially introduced into the heart via the right atrium 14 using known techniques. For example, a stylet 38 inserted into a lumen of the lead body may be used to manipulate and steer the distal end portion of the lead body to a target location.

To pass the distal end portion 28 of the lead body from the right atrium through to the left atrium, the atrial septum 18 may be pierced using, for example, a piercing tool (not shown) or using a lead body having a relatively sharp and hard distal tip (not shown). In either case, the piercing device is manipulated to create an access tunnel 40 through the septum. The access tunnel may be made in the region of the fossa ovalis since this is typically the thinnest portion of the atrial septum. By appropriately manipulating the stylet, the distal end portion 28 of the lead body is then maneuvered through the access tunnel 40 in the atrial septum so that all or a portion of the pressure sensing module protrudes into the left atrium 16.

The distal end portion 28 of the lead body 26 includes an attachment structure serving to attach the lead to the atrial septum 18. The attachment structure may take many forms including, without limitation, one or more tines, flexible membranes, inflatable membranes, circumferential tines and/or distal end lead body portions having a J-shaped configuration. FIG. 1 represents the attachment structure in a generalized manner including first and second structures 42 and 44, respectively, on opposite sides of the septum 18.

The distal end portion 28 of the lead body may also carry one or more electrodes such as a ring electrode 46 disposed in the right atrium 14 proximally of the pressure sensor module 34 for unipolar pacing and/or sensing the right atrium. Additional electrodes (not shown) may be carried by the distal end portion 28 of the lead body so as to provide bipolar pacing, sensing and/or shocking operation, in accordance with structures and techniques well-known in the art.

Attached to the proximal end 30 of the lead body is an electrical connector assembly 48 adapted to be received by a receptacle in a permanent or temporary medical device (not shown) containing appropriate pressure measurement processing circuitry as well as pacing, sensing, shocking and other electrical circuitry all in accordance with techniques and principles well-known in the art.

The connector assembly 48 carries a plurality of terminal contacts 50 electrically connected by conductors to the pressure sensor module 34 and to any electrode(s) disposed along the distal end portion of the lead body. The electrical conductors may comprise conventional coil or cable conductors or a combination of both; to minimize the diameter of the lead body, cable conductors are preferred.

Figure 2:
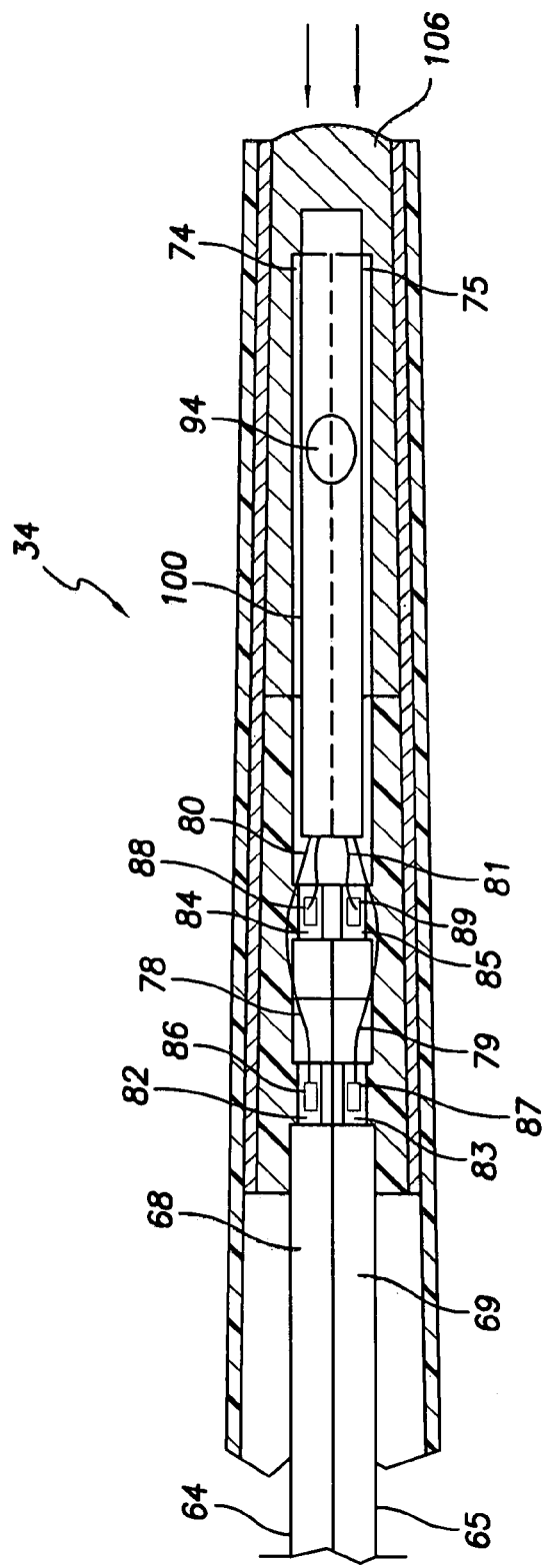
FIG. 2 is an axial cross-section view of the distal end portion of the lead illustrated in FIG. 1 showing details of the pressure sensor module.
Figure 3:
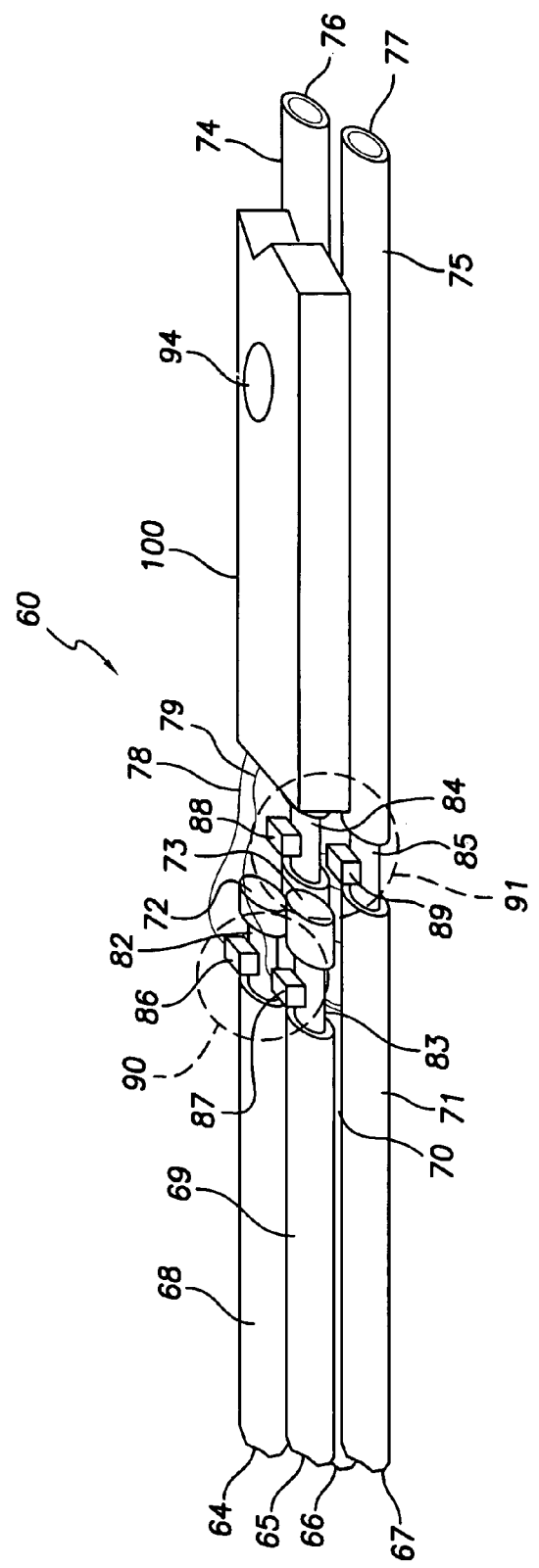
FIGS. 3-5 are perspective views of portions of the pressure sensor module of FIG. 2 showing various stages in the fabrication of the module.
Figure 4:
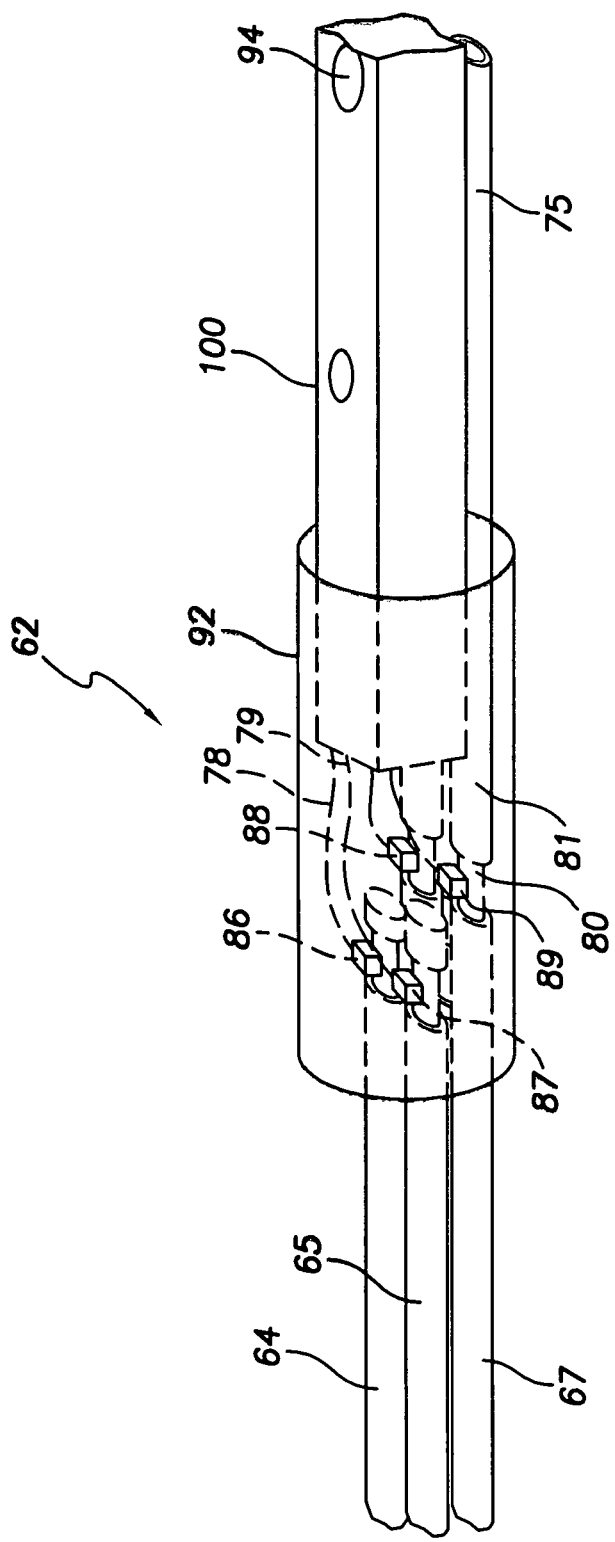
Figure 5:
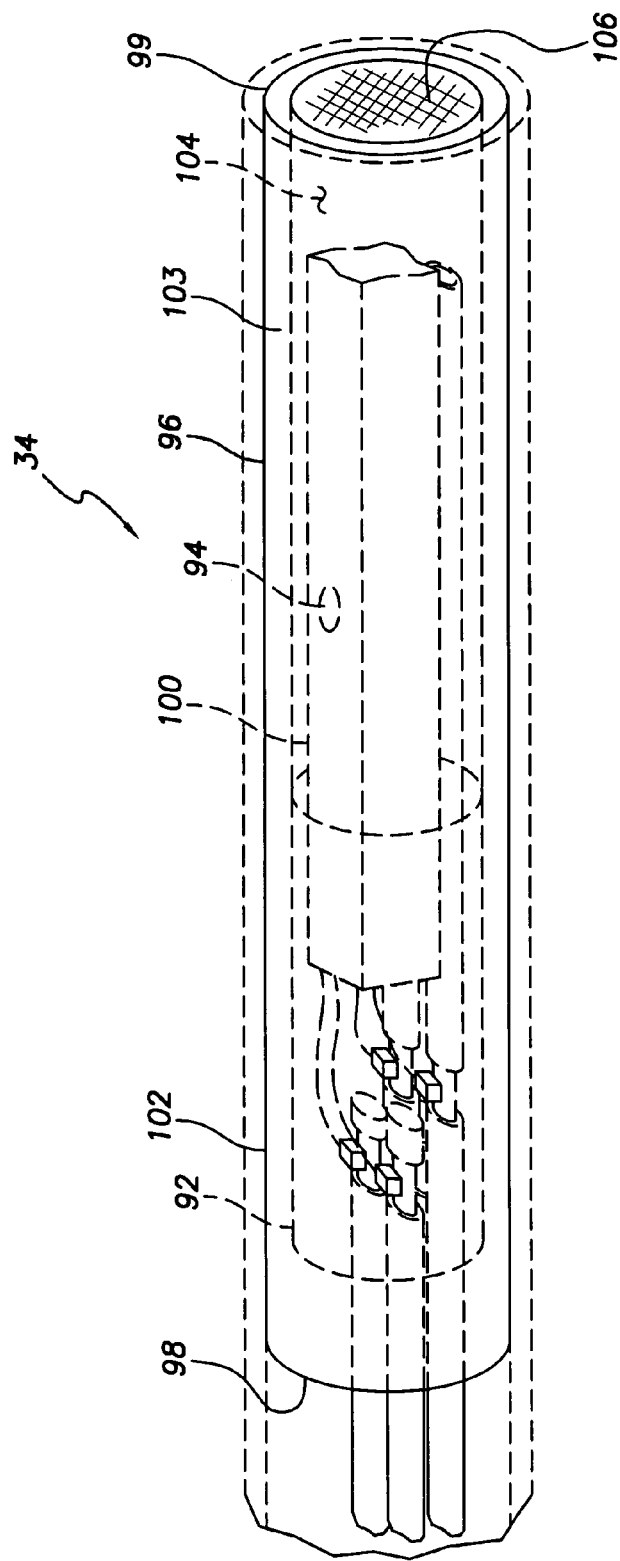

FIGS. 2 and 5 show in greater detail one embodiment of the pressure sensor module 34. FIGS. 3 and 4 depict subassemblies 60 and 62, respectively, of the module 34 illustrating stages in its fabrication.

The pressure sensor module 34 is serviced by four insulated electrical conductors 64-67 having distal ends 68-71, respectively, preferably arranged or bundled within the module in a two-by-two array to optimize the compactness of the module. In a preferred embodiment, each of the electrical conductors 64-67 may comprise an insulated 1×19 cable conductor. The distal ends 68 and 69 of the pair of cable conductors 64 and 65 (for convenience called the first or upper pair of conductors) are preferably disposed in parallel, abutting (or near-abutting) relationship. The distal ends 70 and 71 of the remaining pair of cable conductors 66 and 67 (for convenience called the second or lower pair of conductors) are disposed in parallel relationship directly under the first pair of conductors 64 and 65, in vertical alignment therewith. The first or upper pair of conductors 64 and 65 have distal extremities 72 and 73, respectively. The distal ends of the second or lower pair of conductors 66 and 67 have extensions 74 and 75 projecting distally beyond the extremities 72 and 73 of the upper cables to distal extremities 76 and 77 so that the conductor pairs 64, 65 and 66, 67 define a stepped arrangement. The extensions 74 and 75 of the lower pair of side-by-side conductors form a platform for carrying a pressure sensor 100 in the form of a transducer or chip which, in the example shown, comprises a monolithic integrated capacitive absolute pressure sensor chip such as that manufactured by Fraunhofer Institute of Microelectronic Circuits and Systems, Duisburg, Germany, having four lead wires 78-81 projecting from an end thereof. It will be evident that other miniature pressure sensors may be used instead. For example, the pressure sensor chip manufactured by Kablico, although somewhat wider than the Fraunhofer chip, has only three lead wires.

The distal ends 68 and 69 of the upper conductors adjacent to the distal extremities thereof include sections stripped of insulation thereby exposing short lengths 82 and 83 of the conductors. Likewise, the distal ends 70 and 71 of the lower cables conductors include sections stripped of insulation thereby exposing short lengths 84 and 85 of the electrically conductive cables. The stripped conductor lengths 84 and 85 are longitudinally offset from, and disposed just distally of, the distal extremities 72 and 73 of the upper conductors.

Attached to the stripped conductor sections 82-85 are connection pads 86-89, respectively, attached, for example, by laser welding to the exposed conductor sections. The four lead wires 78-81 are wire bonded to their respective pads 86-89 using any known wire interconnection technique such as soldering, welding or any integrated circuit wire bonding technique. The positions of the pressure sensor 100 and lead wires 78-81 relative to the distal ends of the conductors may be stabilized by masses 90 and 91 of a bonding material such as epoxy (FIG. 3). The bonding material also provides electrical insulation and hermetic sealing. During fabrication, any excess bonding material may be ground away or otherwise removed to expose the wire bonding surfaces of the pads 86-89.

With reference to FIG. 4, the module subassembly 62 in the region of the bonding pads 86-89 is encapsulated in a tightly molded insulative jacket 92 of epoxy or the like. It will be seen from FIG. 4 that the molded encapsulation or jacket 92 envelops all of the wire bonding pads 86-89 as well as a portion of the pressure sensor chip 100 adjacent to the end of the chip from which the lead wires 78-81 project. This leaves the remaining, unencapsulated portion of the pressure sensor chip exposed. This exposed portion of the pressure sensor chip includes a pressure responsive, deflectable membrane 94 forming one of the plates of a capacitor that is movable in relation to a fixed plate (not shown) carried by the pressure sensor chip 100. The entire assembly that has been formed up to this point is next inserted into a metallic, tubular housing 96 having opposed proximal and distal ends 98 and 99 and associated proximal and distal end portions 102 and 103, respectively. (FIG. 5.) The proximal end portion 100 of the housing fits sealingly over the molded jacket 92 while the distal end portion 103 of the housing projects distally past the distal extremities 76 and 77 of the lower conductor pair and the distal end of the pressure sensor chip 100. Instead of a molded epoxy jacket within the proximal portion of the pressure module housing, any hermetic seal, including but not limited to conventional hermetically sealing, ceramic feedthroughs may be employed.

The metal tubular housing 96 may be made of any biocompatible, biostable material including, but not limited to platinum, iridium, a platinum/iridium alloy, stainless steel, gold, and so forth. The housing 96 may be conveniently made of standard tubular stock such as that used for hypodermic needles instead of the specially machined housings or casings that are currently employed. The use of such standard tubular stock together with the elimination of conventional electrical connection feedthroughs and metallic seals at both ends of the assembly results in significant reductions in the costs of parts, tooling and manufacturing.

The housing 96 may be conveniently made of standard hypodermic needle stock having outside and inside diameters of, for example, 7 and 6.5 F (0.091 and 0.085 inch), respectively. More generally, the housing may comprise any tubular stock preferably made of a biocompatible metal or metallic alloy such as stainless steel or Nitinol. Although a circular cross-section is preferred, it will be evident that tubular stock having other cross section configurations, including polygonal shapes such as square, rectangular, hexagonal, and so forth, may be utilized.

The interior of the distal end portion 103 of the housing 96 extending between the distal end of the molded sealing jacket 92 and the distal end 99 of the housing defines a chamber 104 that is filled through the distal end of the housing with an uncured liquid gel, such as a silicone gel, polyacrylamide or any other biocompatible gel. The gel is forced into the chamber 104 so as to substantially fill the entire interior volume thereof. Any air bubbles may be removed from the gel by subjecting the assembly to a vacuum for an appropriate period of time. The liquid gel is cured over a period of, for example, one day. It will thus be seen that atrial blood pressure transients applied to a distal end face 106 of the gel will be transmitted longitudinally by the gel to the pressure sensitive portion or deflectable membrane 94 of the pressure sensor 100. In well known fashion, these pressure variations are converted to varying electrical signals transmitted via the lead wires 78-81 and the cable conductors 64-67 to the lead's connector assembly. Alternatively, the distal end 99 of the housing 96 may be sealed with a deflectable membrane such as that described below in connection with the embodiment of FIGS. 6 and 7.

It will be seen that in the pressure sensor module 34 of the invention, as exemplified by the embodiment of FIGS. 2-5, the pressure sensor 100 is mounted directly on the conductors 66 and 67 electrically connected to the sensor thereby eliminating the substrate that is conventionally used. Elimination of the substrate can result in a substantial reduction in the overall size of the pressure sensor module.

A pressure sensor module in accordance with the invention employing a Fraunhofer pressure sensor chip may have a diameter of only about 0.065 inch (5 F), a significant reduction from the 0.104 inch (8 F) or larger size typical of existing designs using substrates and conventional electrical connection feedthroughs. It will be evident that the compactness of the pressure sensor module of the invention facilitates its incorporation into the distal end portion of a lead body having a small diameter of, for example, 0.091 inch (7 F) thereby facilitating its placement within various regions of the heart with minimum trauma and blood flow restriction.

Figure 6:
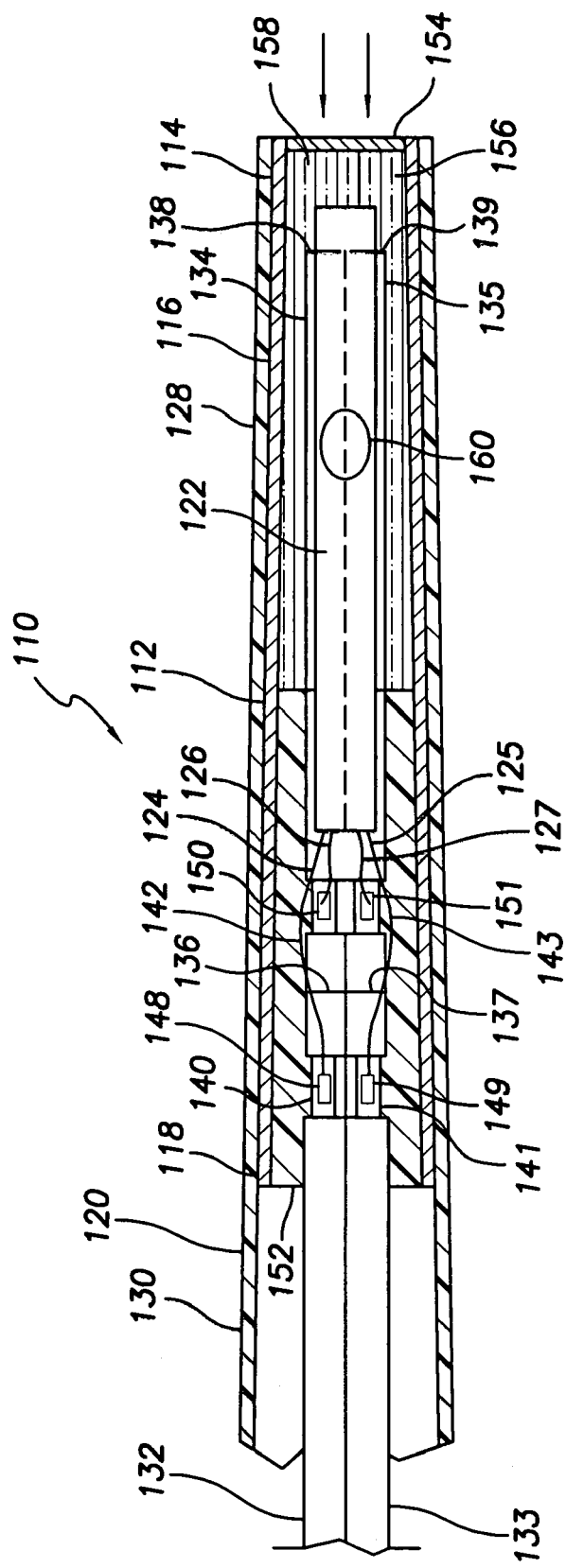
FIG. 6 is an axial cross-section view of the distal end portion of an endocardial lead incorporating a cardiac pressure sensor module in accordance with another embodiment of the invention.
Figure 7:
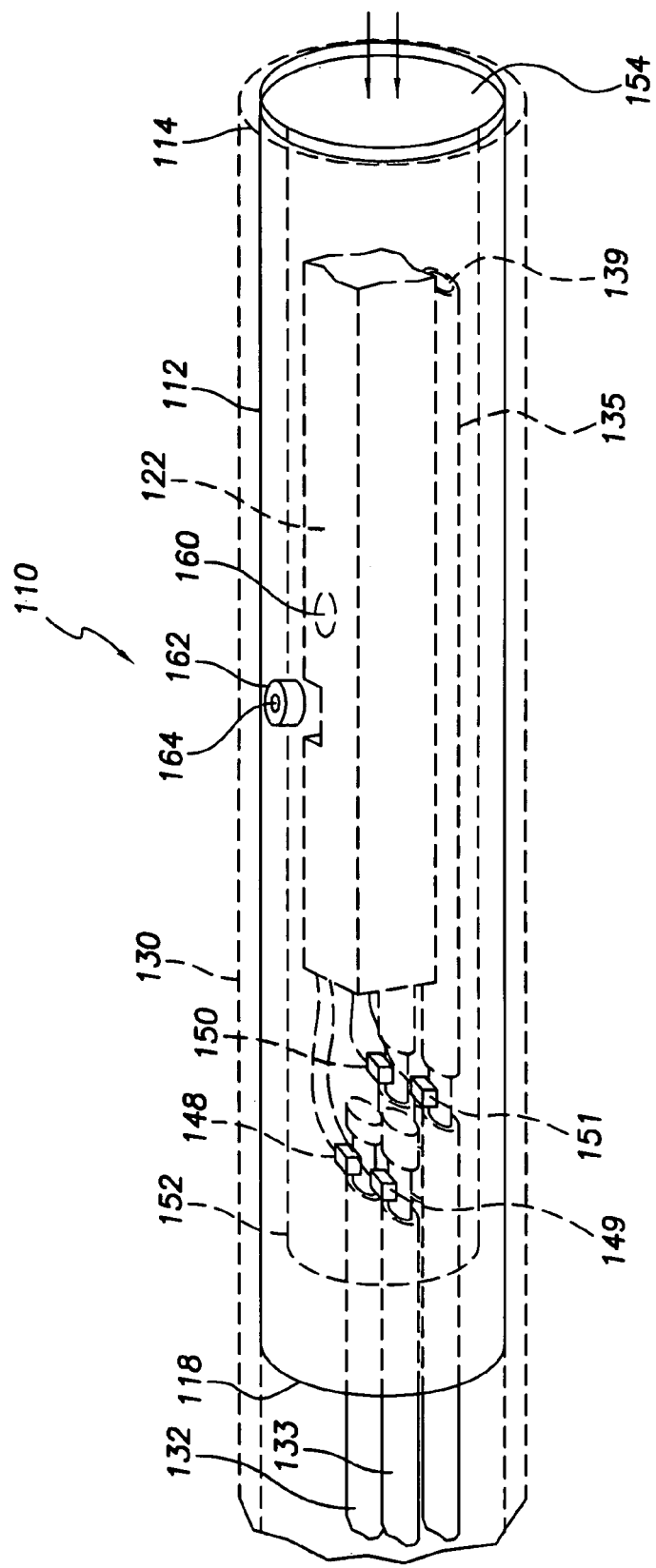
FIG. 7 is a perspective view of the distal end portion of the lead shown in FIG. 6.

FIGS. 6 and 7 illustrate a pressure sensor module 110 in accordance with an alternative embodiment of the present invention. The module 110 comprises a tubular housing 112 having a distal end 114, a distal end portion 116, a proximal end 118, and a proximal end portion 120. As in the first embodiment, the module 110 preferably employs a Fraunhofer pressure sensor chip 122 comprising four wire leads 124-127. The module 110 is adapted to be incorporated into the distal end portion 128 of a lead body sheath 130 such as that shown in FIG. 1. As before, the sensor 122 is serviced by four insulated electrical conductors 132-135, preferably cable conductors having proximal ends coupled to terminal contacts on a connector assembly (not shown) and distal ends 136-139, respectively that are bunched together in a two-by-two array. The distal ends 138 and 139 of the longer, lower pair of cables 134 and 135 serve as a mounting platform for the pressure sensor chip 122 which is directly attached to the distal ends of the cables. As before, short sections 140-143 of the cables are stripped of insulation to expose the wire cable within. The wire leads 124-127 of the pressure sensor chip are wire-bonded to connection pads 148-151 on the exposed sections of the associated cables. Also as before, the proximal end portion 120 of the housing 112 is hermetically sealed with a molded jacket 152 of epoxy or the like providing a fluid tight seal around the cables conductors 132-135.

Sealing the distal end 114 of the housing 112 is a deflectable membrane 154. Defined between the jacket 152 within the proximal portion of the housing and the deflectable membrane 154 at the distal end of the housing is a chamber 156 filled with a fluid medium 158 capable of transmitting axially directed pressure from the membrane to a flexible, pressure responsive diaphragm 160 on an outer surface of the pressure sensor 122. Pressure variations in the left side of the heart thus cause the membrane 154 to correspondingly deflect which in turn creates pressure transients in the fluid medium in communication with the pressure sensor diaphragm 160. The pressure transients thus sensed by the capacitive pressure sensor 122 generates corresponding electrical signals that are transmitted to the permanent or temporary medical device via the cable conductors 132-135 and the connector assembly at the proximal end of the lead body.

A variety of fluids may be enclosed within the chamber 156. By way of example, the fluid may consist of any biocompatible liquid such as water, saline, silicone oil, polyethylene glycol (PEG), mineral oil, castor oil or any food oil. A low viscosity liquid such as PEG is preferred because such liquid is more easily loaded into the sensor chamber and more readily cleared of bubbles under vacuum.

The deflectable membrane 154 may be formed of various materials including, without limitation, any biocompatible, biostable material such as silicone rubber, polyurethane or metal. The metal may comprise, for example, titanium, platinum, stainless steel or Nitinol. Instead of a flat, deflectable membrane, it will be evident that the flexible membrane 154 may take in the form of a bellows may be used instead so as to allow for a higher degree of flexibility for pressure transfer. Whatever its specific form, the membrane 154 may be attached to the distal end of the housing 112 using any suitable, conventional bonding means such as a medical adhesive, an epoxy, a laser weld, or an e-beam weld.

The distal end portion 116 of the housing 112 includes a port 162 in the side wall thereof in communication with the chamber 156 for loading the fluid into the chamber and for eliminating air bubbles in the material through the application of a vacuum. The elimination of bubbles assures that the transducer will accurately sense pressure variations applied to the end membrane 154 without errors introduced by the compression of air bubbles or by temperature variations. After loading the chamber with the fluid and purging any entrapped air bubbles, the port 162 may be sealed in any convenient fashion such as by means of a threaded plug 164.

Figure 8:
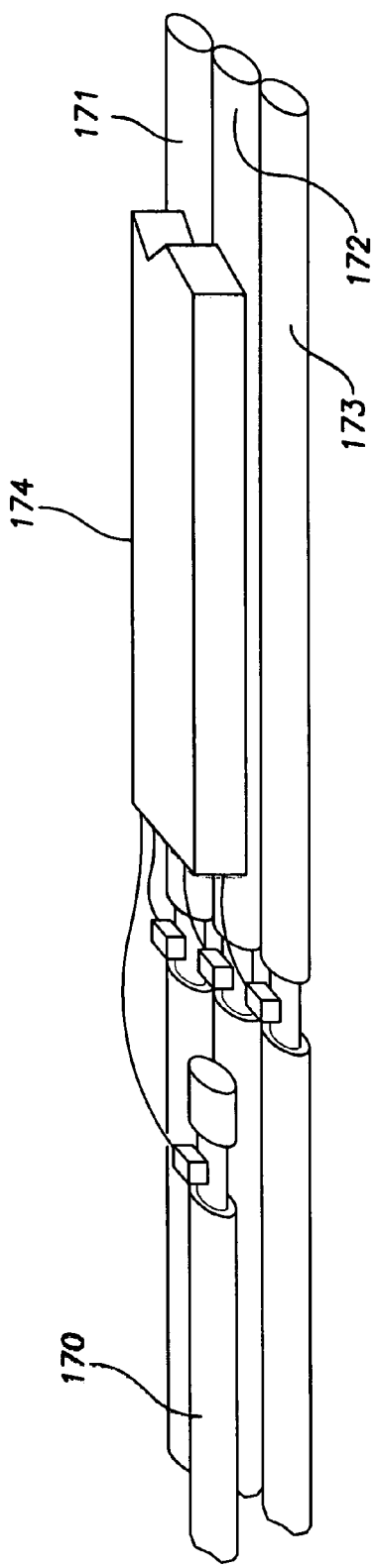
FIGS. 8 and 9 are perspective views of portions of pressure sensor modules in accordance with other alternative embodiments of the invention.
Figure 9:
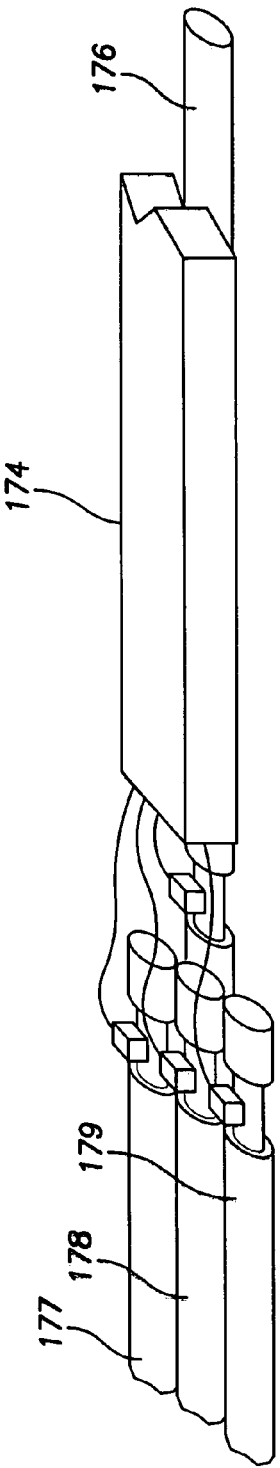

As noted, the stepped, two-by-two cable bundling arrangement with the sensor 122 mounted on extensions of the lower pair of conductors 134 and 135 provides a particularly efficient, compact structure. It will be evident, however, that alternative cable arrangements may be provided. For example, as shown in FIG. 8, four cable conductors 170-173 may be arranged in a stepped one-by-three configuration with a sensor 174 mounted on the distal end of the three side-by-side conductors 171-173 or, alternatively, as seen in FIG. 9, the sensor may be mounted on the distal end of a single conductor 176 in a three-by-one array of four conductors 176-179.

Figure 10:
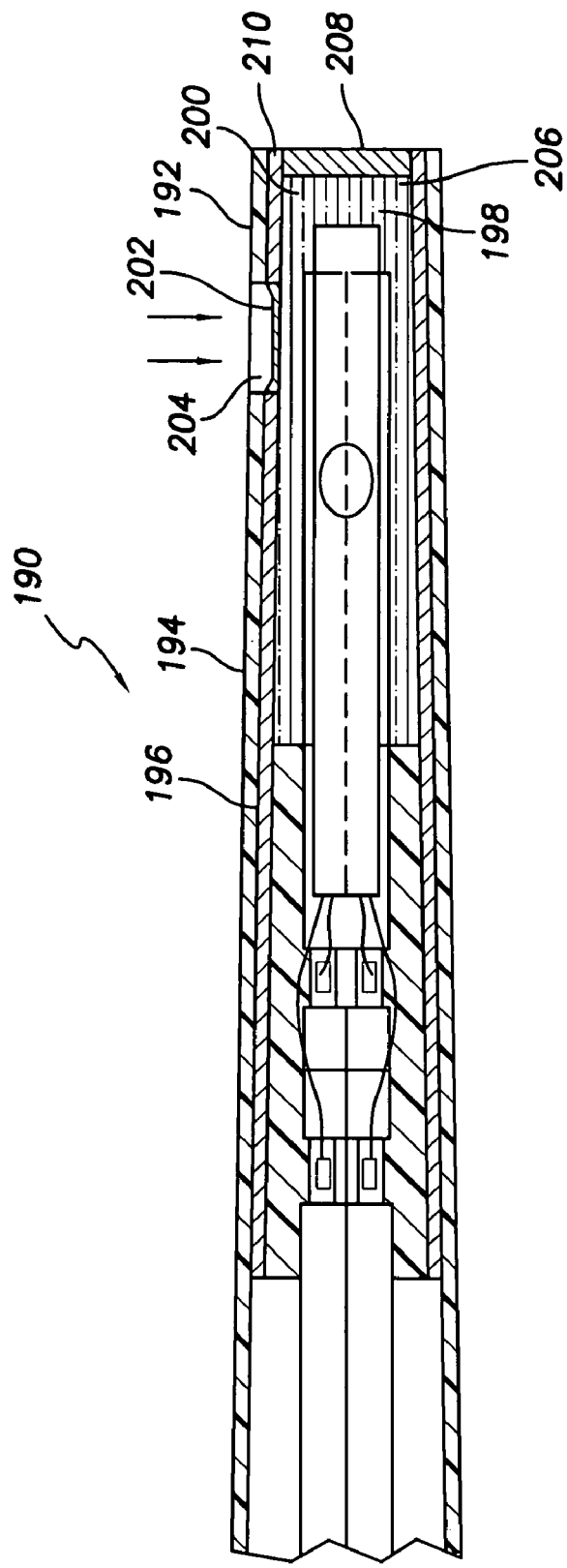
FIG. 10 is an axial cross-section view of the distal end portion of an endocardial lead in accordance with yet another embodiment of the invention.
Figure 11:
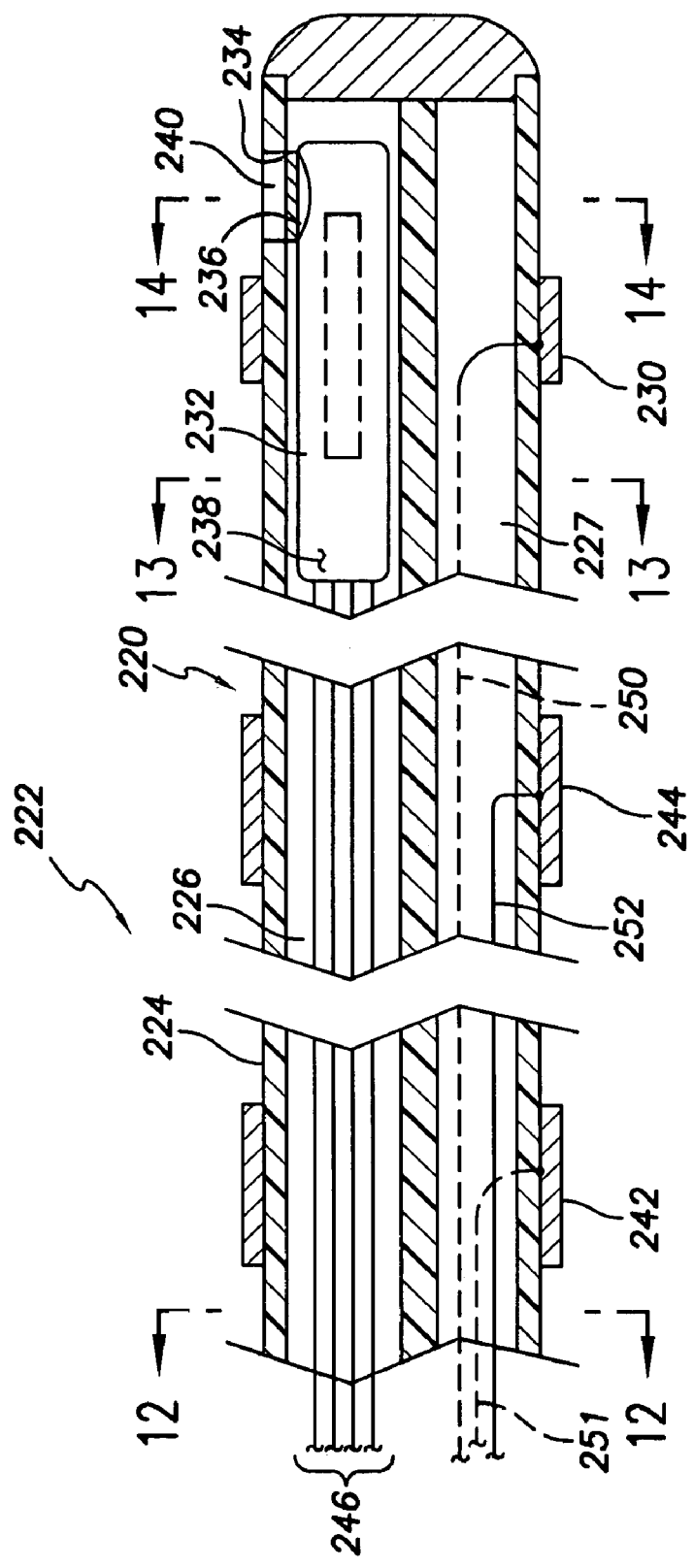
FIG. 11 is an axial cross section view of the distal end portion of a lead pursuant to another embodiment of the invention.
Figures 12, 13, 14:
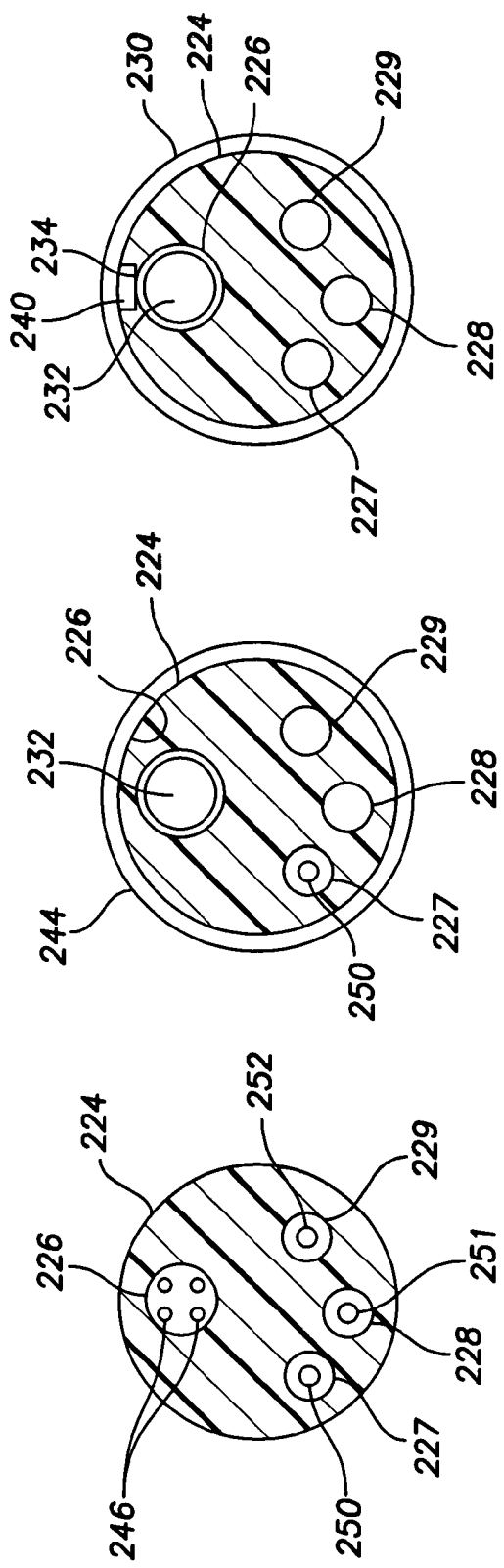
FIG. 12 is a transverse cross section view of the lead of FIG. 11 as seen along the line 12-12 in FIG. 11.
FIG. 13 is a transverse cross section view of the lead of FIG. 11 as seen along the line 13-13 in FIG. 11.
FIG. 14 is a transverse cross section view of the lead of FIG. 11 as seen along the line 14-14 in FIG. 11.

FIG. 10 illustrates a pressure sensor module 190 in accordance with another embodiment of the present invention. The module 190 is carried within a distal end portion 192 of a lead body sheath 194. The module may have basically the same construction as that depicted in FIGS. 6 and 7, in that the module comprises a housing 196 defining a chamber 198 filled with a fluid 200 for transmitting pressure variations via a deflectable membrane 202. However, instead of the deflectable membrane being located at the distal end of the module's housing as seen in FIGS. 6 and 7, the deflectable membrane 202 in the module of FIG. 10 is placed within an aperture 204 extending through the side walls of the lead body sheath 194 and the housing 196 along the distal portion of the module. The distal end 206 of the chamber 198 is closed by means of a rigid plate or cap 208 secured by welding, for example, to the distal end 210 of the housing 196. The module of this embodiment will sense blood pressure variations applied transverse to a longitudinal axis of the module.

FIGS. 11-15 illustrate schematically the distal end portion 220 of a lead body 222 in accordance with yet another embodiment of the present invention. The lead body 222 comprises a multilumen sheath 224 having, in the case illustrated, four longitudinally extending lumens 226-229 one of which (lumen 226) has a diameter that is larger than those of the remaining three lumens. The lead body 222 has a distal end carrying a distal ring electrode 230. Enclosed within the larger lumen 226 is a pressure sensor module 232 along the lines of that shown in FIG. 10 having a pressure responsive, deflectable membrane 234 carried within an aperture 236 formed in the sidewall of the module's housing 238. The aperture 236 is in registration with an aperture 240 formed in the sheath 224.

The distal end portion 220 may also carry a pair of longitudinally spaced-apart pacing and/or sensing ring electrodes 242 and 244 disposed proximally of the sheath aperture 240 for contacting cardiac tissue such as that within the right atrium, SVC, and so forth. Cable conductors 246 servicing the pressure sensor module extend proximally from the module to a connector assembly (not shown) at the proximal end of the lead.

The three smaller lumens 227-229 contain cable conductors 250-252, respectively, connected to the distal ring electrode 230, the proximal ring electrode 242 and the distal ring electrode 244.

Figure 15:
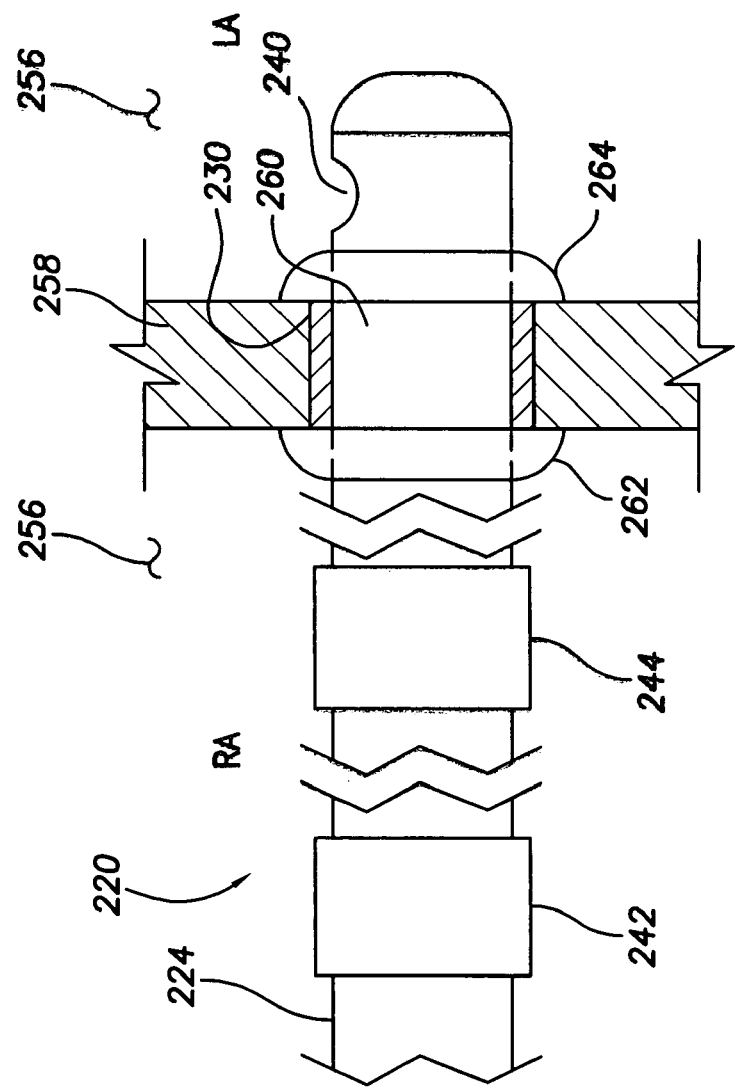
FIG. 15 a schematic, side elevation view of the distal end portion of the lead of FIG. 11 shown anchored in the atrial septum of a heart.

FIG. 15 also shows schematically a portion of a heart comprising a left atrial chamber 254, a right atrial chamber 256 and a septal wall 258 separating the two chambers. The distal end portion 220 of the lead body 222 projects through an access tunnel 260 formed in the septal wall 258 in the manner already described, and is secured in place by an attachment structure comprising first and second anchoring structures 262 and 264 on opposite sides of the septal wall 258. The distal end portion 220 of the lead body is placed so that the distal ring electrode 230 is in contact with the circumferential surface defining the tunnel 260 in the septal wall 258, so as to stimulate and/or sense the electrical activity of the tissue of the septal wall. The side aperture 240 is in communication with the interior of the left atrial chamber 254 so that the pressure sensor module 232 is thereby disposed to sense left atrial pressure. The pair of ring electrodes 242 and 244 may be positioned, for example, within the right atrium 256 or proximally thereof and these electrodes along with the distal ring electrode 230 disposed in contact with the septal wall 258 may be used in various combinations for pacing and/or sensing the electrical activity within the atrial chambers. It will be evident that additional ring electrodes, as well as one or more shocking electrodes, may be disposed along the distal end portion 220 of the lead body. It will also be apparent that instead of the continuous ring electrode 230, a series of discrete, circumferentially spaced-apart electrodes such as dot electrodes may be utilized.

Figure 16:
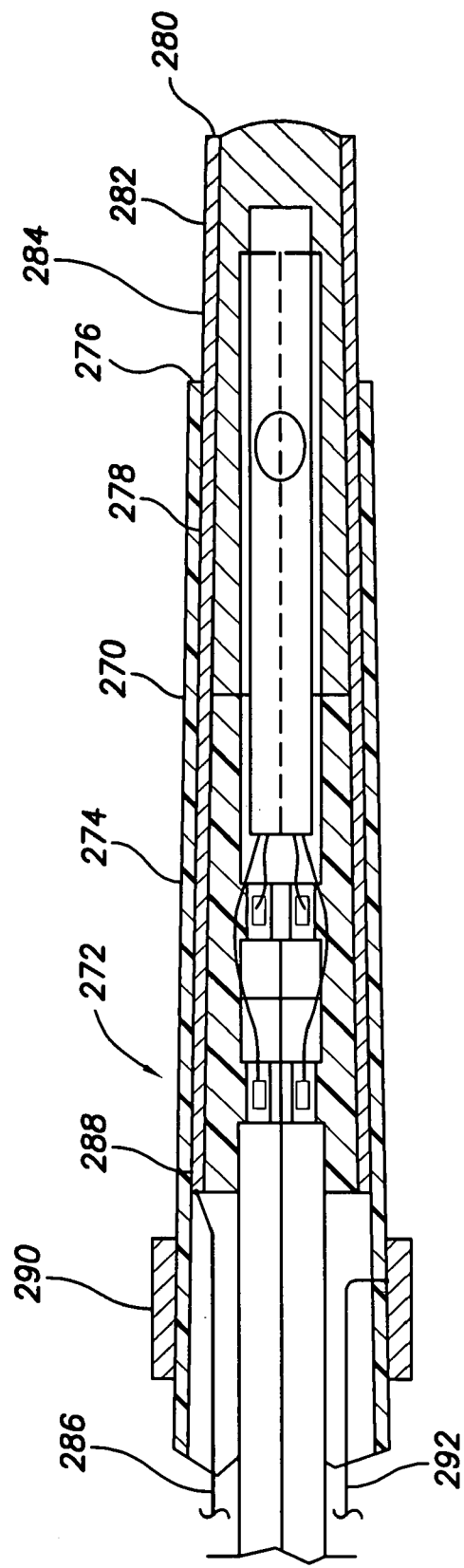
FIG. 16 is a schematic, axial cross-section view of the distal end portion of an endocardial lead in accordance with another embodiment of the invention incorporating a cardiac pressure sensor module having a housing serving as one of the ring electrodes of a bipolar ring electrode pair.

FIG. 16 illustrates the distal end portion 270 of a lead body 272 in accordance with yet another embodiment of the invention. The lead body 272 includes an insulating sheath 274 having a distal extremity 276. The distal end portion 270 carries a pressure sensor module 278 that may take the form of any of the embodiments described above. By way of example, FIG. 16 specifically shows a pressure sensor module in accordance with the embodiment of FIG. 2. The distal extremity 276 of the insulating sheath 274 is positioned proximally of a distal tip 280 of the sensor module 278. In this way, a portion of an outer surface 282 of the metallic, electrically conductive housing 284 of the pressure sensor module is exposed and can therefore function as a pacing, sensing and/or shocking electrode. Accordingly, there is provided an electrical conductor 286 coupling a terminal contact on a connector assembly (not shown) on a proximal end of the lead body with a proximal end 288 of the sensor module's housing 284.

The insulating sheath 274 may also carry a ring electrode 290 proximal of the pressure sensor module 278 and coupled to a terminal contact on the connector assembly by means of an electrical conductor 292. The pressure sensor module 278 may be mounted to sense left atrial pressure in the fashion already described. As explained in connection with the embodiment shown in FIGS. 2 and 5, the distal tip 280 of the module 278 may be sealed with a deflectable membrane.

Figure 17:
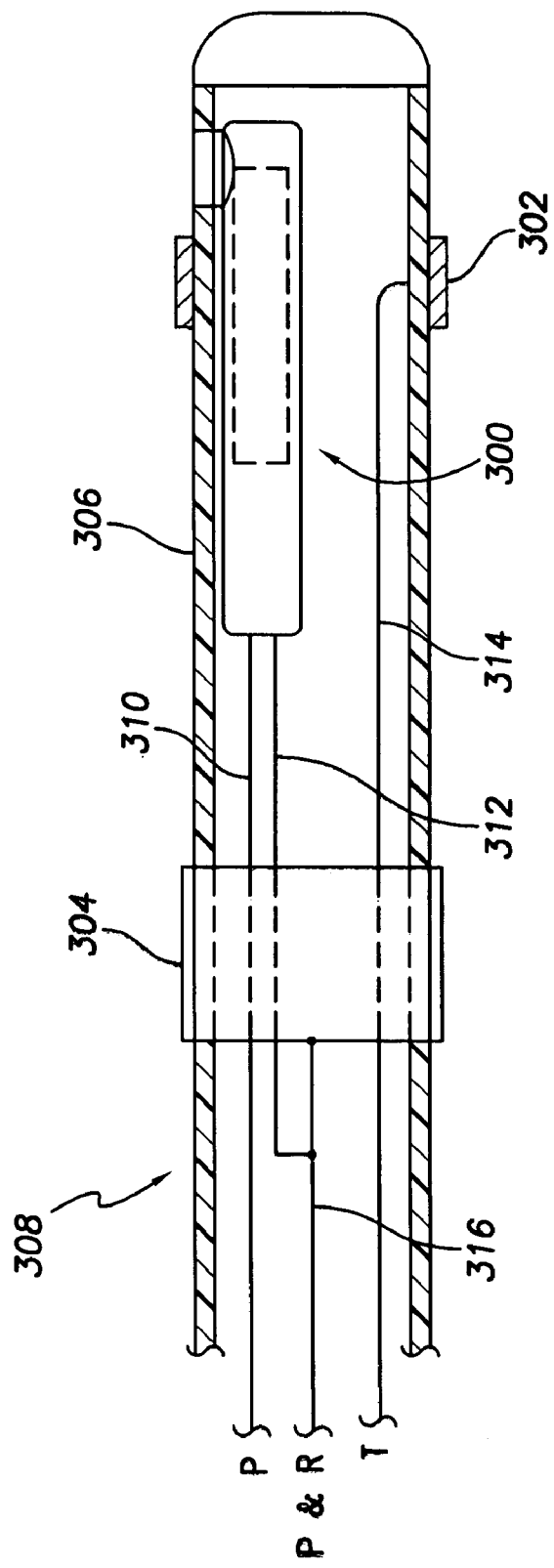
FIG. 17 is a schematic illustration of still another embodiment of the invention.

Turning now to FIG. 17, there is shown in schematic form a pressure sensor module 300 of the kind shown, for example, in FIGS. 11 through 15, along with a distal ring electrode 302 and a proximal ring electrode 304 disposed along a distal end portion 306 of a lead body 308. The distal ring electrode 302 is disposed to be placed within a tunnel formed in a septal wall of the heart. The pressure sensor module 300 includes a pair of electrical conductors 310 and 312 extending from a proximal end of the module. Individual cable conductors 314 and 316 connect the ring electrodes 302 and 304, respectively, to associated contacts on a connector assembly (not shown). To minimize the lead body diameter, one of the pressure sensor module cable conductors, in this case, the conductor 312, may be connected to the ring electrode conductor 316 just proximally thereof. In this way, only three conductors (310, 314, 316) extend the length of the lead body 308. As in the embodiment shown in FIGS. 11-15, a series of discrete, circumferentially spaced-apart electrodes, such as dot electrodes, may be substituted for the continuous ring electrode 302.

While certain exemplary embodiments have been described above in detail and shown in the accompanying drawings, it is to be understood that such embodiments are merely illustrative and not restrictive of the invention. In particular, it should be recognized that the teachings of the invention apply to a wide variety of systems and processes and it will be recognized that various modifications may be made to the illustrated and described embodiments without departing from the broad inventive scope thereof. Accordingly, the invention is intended to cover any changes, adaptations or modifications that are within the scope and spirit of the invention as defined by the appended claims.

What is claimed is:

1. A body fluid pressure sensor module comprising:
a housing having a first end and a second end;
a pressure sensor within said housing, the pressure sensor being electrically coupled to a plurality of electrical conductors extending into said housing through a feedthrough disposed within, and hermetically sealing, said first end of said housing, said housing defining a chamber between said feedthrough and said second end of the housing; and
a biocompatible gel or fluid within said chamber in communication with said pressure sensor, the biocompatible gel or fluid being capable of transmitting pressure to said pressure sensor;
wherein the housing has a side wall having an aperture therethrough, and wherein the pressure is transmittable by said biocompatible gel or fluid in a direction transverse to a longitudinal direction extending between said first and second ends of the housing;
wherein said pressure sensor has a diaphragm disposed at the aperture;
wherein said second end of said housing comprises a deflectable membrane, and wherein the biocompatible gel or fluid transmits axially directed pressure from the deflectable member to the diaphragm; and wherein the deflectable membrane is disposed at a distal tip of a lead.

2. The module of claim 1 wherein:

the plurality of electrical conductors have ends within said housing, said pressure sensor being mounted on the end of at least one of the conductors.

3. The module of claim 1 wherein:

each of the plurality of electrical conductors comprises an insulated cable conductor, a section of each cable conductor being exposed for electrical connection to an associated lead on the pressure sensor.

4. The module of claim 1 wherein:

the plurality of electrical conductors comprise four conductors.

5. The module of claim 1 wherein:

the housing has a sealable port in a side wall of the housing, said port communicating with the chamber and whereby said material comprises a fluid loadable into the chamber through said port.

6. The module of claim 1 wherein:

the housing comprises an electrically conductive material.

7. The module of claim 1, wherein the deflectable membrane is transverse to a longitudinal axis of the housing.

8. A transceptal lead comprising:

a lead body having a proximal portion and a distal portion;

a first and second attachment structure at the distal portion of the lead body to secure the lead body to a transceptal wall of the heart, the first attachment structure disposed within a right atrial chamber and abutting the transceptal wall, the second attachment structure disposed within a left atrial chamber and abutting the transceptal wall;

a housing defining a chamber, the housing disposed at the distal portion of the lead body;

a plurality of electrical conductors having ends disposed within said housing;

a pressure sensor within said housing, the sensor being mounted directly on the ends of the electrical conductors and coupled electrically to said conductors; and a material within said chamber in communication with said sensor, the material being capable of transmitting pressure to said pressure sensor;

wherein the chamber is closed at the distal end of the housing by a deflectable membrane, wherein the membrane is adapted to transmit pressure to the material in said chamber, and wherein the membrane is disposed at a distal tip of the lead body.

9. The lead of claim 8 wherein:

said pressure-transmitting material comprises a biocompatible gel or fluid.

10. The lead of claim 8 wherein:

the housing includes a side wall having an opening therethrough and wherein the pressure is transmittable by said material in a direction transverse to the longitudinal direction.

11. The lead of claim 8 wherein:

the chamber is closed at the distal end of the housing by a deflectable membrane, the membrane being adapted to transmit pressure to the material in said chamber.

12. The lead of claim 8 wherein:

the housing has a sealable port in a side wall of the housing, said port communicating with the chamber and whereby said material comprises a fluid loadable into the chamber through said port.

13. The lead of claim 8 wherein:

the deflectable membrane is transverse to a longitudinal axis of the lead body.

\* \* \* \* \*